United States Patent [19]

Schwartz

[11] 4,233,488
[45] Nov. 11, 1980

[54] DEEP THROAT RESISTANCE WELDER

[76] Inventor: Charles A. Schwartz, 24545 Bryden, Beachwood, Ohio 44122

[21] Appl. No.: 854,333

[22] Filed: Nov. 23, 1977

[51] Int. Cl.³ .......................... B23K 9/28; B23K 11/24
[52] U.S. Cl. ......................................... 219/89; 219/90; 219/116
[58] Field of Search .................. 219/116, 86.21, 86.31, 219/87, 78.01, 89, 90; 336/61, 83, 232

[56] References Cited

U.S. PATENT DOCUMENTS

| | | | |
|---|---|---|---|
| 512,603 | 1/1894 | Coffin | 336/61 |
| 1,851,184 | 3/1932 | Holmes | 336/61 |
| 2,346,645 | 4/1944 | Bayles | 219/78.01 |
| 2,803,806 | 8/1957 | Rosenheimer | 336/232 X |
| 2,922,026 | 1/1960 | Hauptmann | 219/116 X |
| 3,503,026 | 3/1970 | Geisel | 336/232 X |

*Primary Examiner*—E. A. Goldberg
*Attorney, Agent, or Firm*—Cullen, Sloman, Cantor, Grauer, Scott & Rutherford

[57] ABSTRACT

A resistance welder is disclosed which provides the same current at the welding electrodes as comparable resistance welders while requiring less input current. The surprising efficiency of the novel resistance welder permits it to accommodate wide workpieces in a deep throat. The increased demand for power to the welding electrodes, which demand results from the deep throat, is satisfied by the surprising efficiency of the combination of elements utilized in the invention. This invention combines linear transformers, having secondary terminals at extreme linear ends of the transformers, which linear transformers function as part of at least one body member of the welder to provide unexpected efficiency. These uniquely placed linear transformers minimize throat inductance and reduce energy consumption.

6 Claims, 6 Drawing Figures

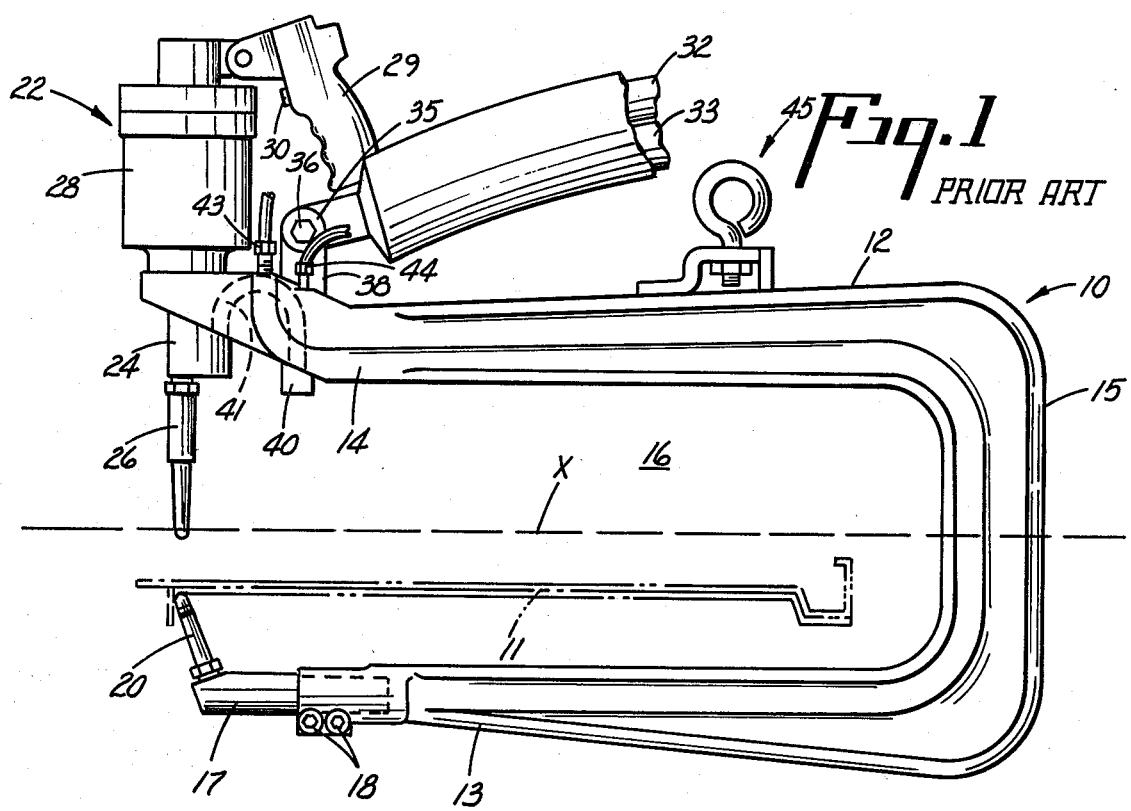
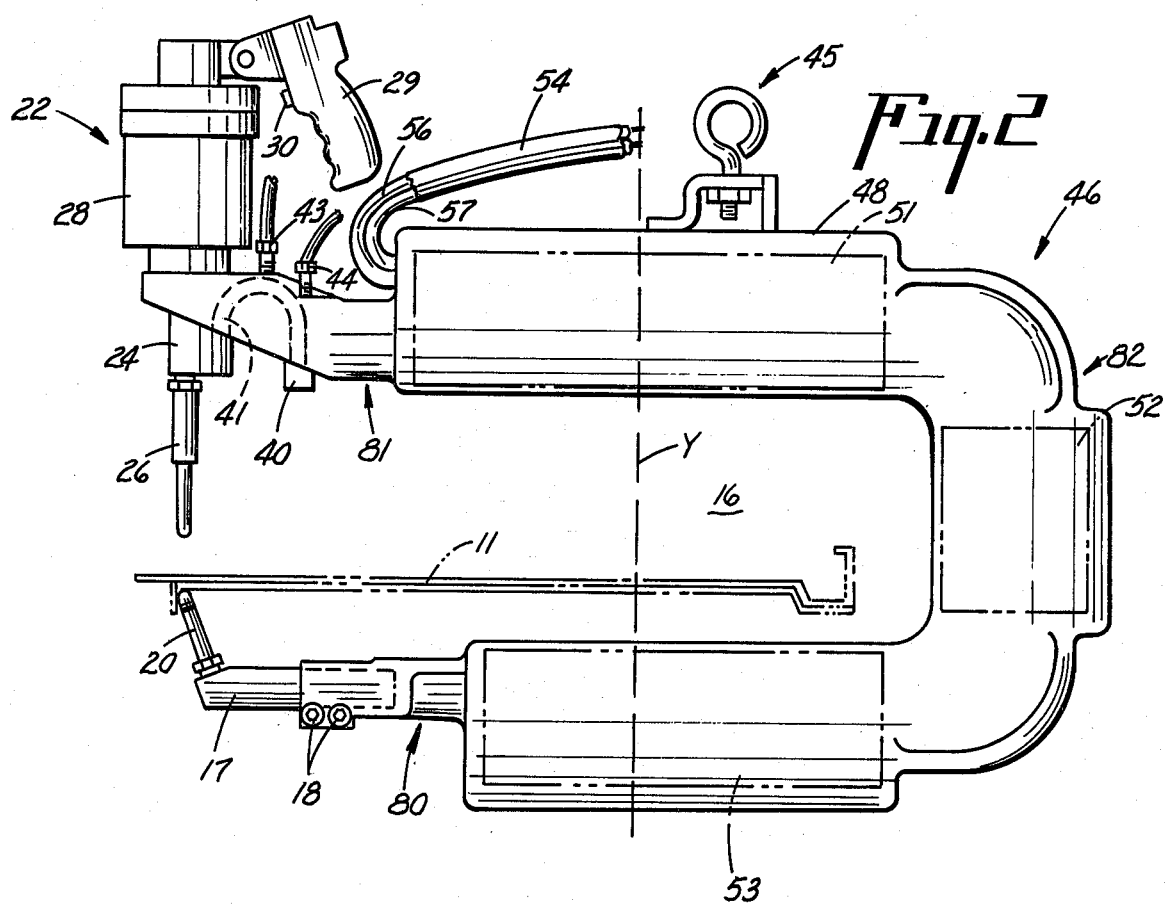

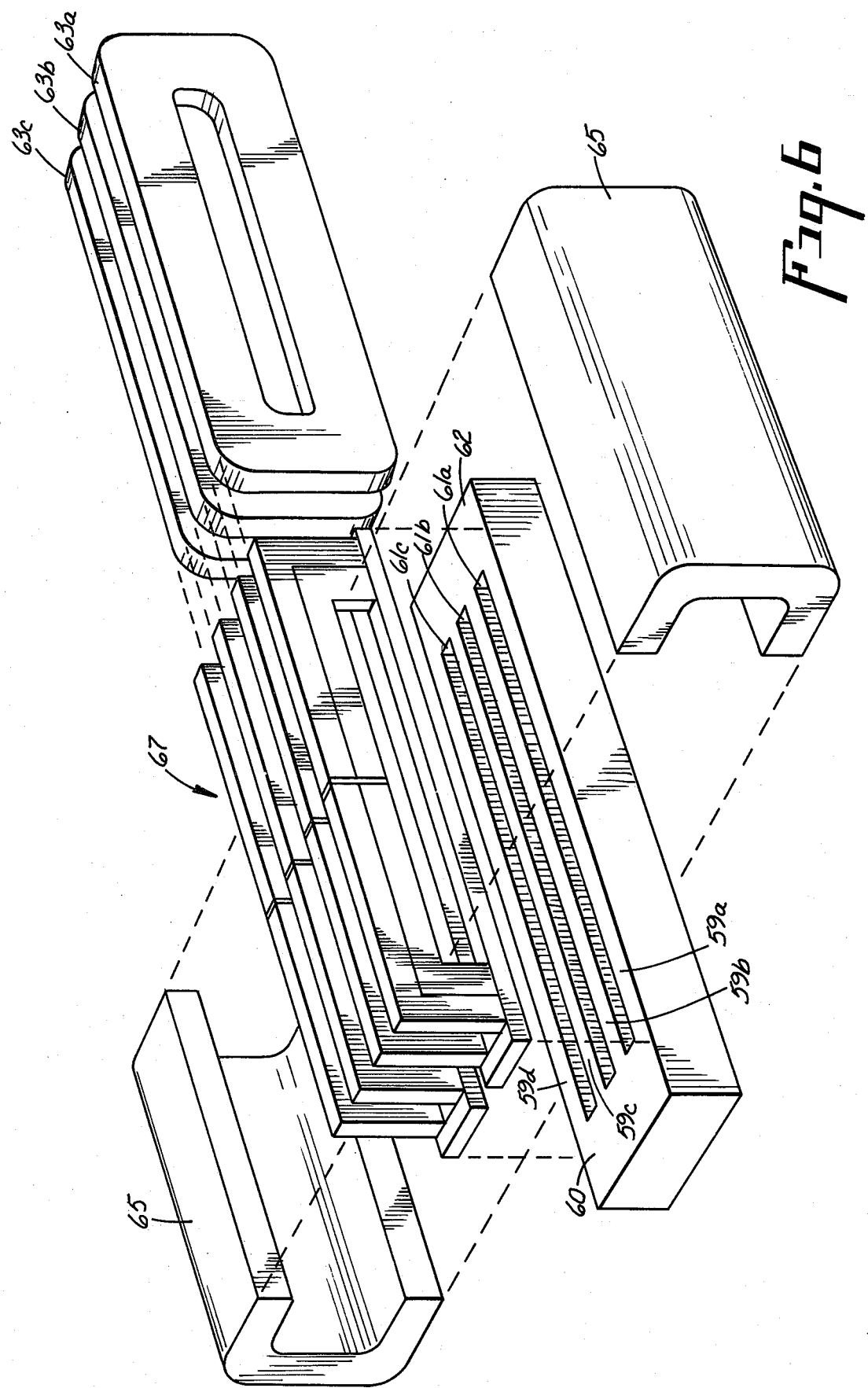

DEEP THROAT RESISTANCE WELDER

BACKGROUND OF THE INVENTION

The present invention relates to an improvement in electrical resistance welders, and more particularly, to resistance welders wherein a deep opening, commonly referred to as a "deep throat", is desirable or necessary.

While electrical resistance welding has been a viable method of welding for years, refinement of the art is constantly being explored. As the workpiece becomes wider the throat of the welder is increased in depth to accommodate the workpiece. The term workpiece, is used hereinafter to connote plural pieces of metal which are to be welded together.

Resistance welders have become a mainstay of automobile construction. Large and small resistance welders are used to weld the body portions of wheeled vehicles of all descriptions. The welding of large body portions such as floor pans, fenders, roof, hood, doors, frames, etc., presents a problem in that it is impractical for the vehicle body to be maneuvered with respect to a stationary welder, requiring the welder to be taken to the work.

Portable resistance welding guns, hereinafter sometimes referred to as guns or gun welders, have been introduced for the purpose of solving the problem of welding large body portions. These guns are, for the most part, standard equipment designs and are obtainable through any of a number of suppliers such as Milco Manufacturing Company. These portable guns allow the welding electrodes to be taken to the workpiece, while the transformer and controls, which are still relatively bulky, are stationary and located at a remote position from the welding machine. The conductors used to operate the portable gun are extremely bulky due to the current capacity required and the cross section to carry it.

Whether a stationary or portable welder is contemplated, the majority of the current provided to the welder is expended in the transfer to the welding electrodes. The power, i.e., $I^2R$, required to weld the workpiece is normally quite small as compared to the total power requirement of the welder. For example, in a conventional resistance welding set-up, at most 10% of the total power actually is required to produce the weld.

The current drain, and subsequent power loss, in the transfer of welding current to the electrodes is a direct result of the inductance due to the throat of the welder. The inductance in this case is caused by the arms of the welder, carrying relatively high current, in close proximity to one another. The inductance within the throat has been a problem since resistance welders were first put into service. While the problem is not eliminated, it is minimized by using a non-deep throat welder. Of course, this solution is not applicable where a deep-throat is necessary.

Since early in the development of resistance welders, cubic transformers have been chosen as the standard. In a cubic transformer both the primary coil and the secondary coil are generally multiple wound coils. The secondary coil is designed so that the terminals are essentially adjacent to one another. This design is convenient for direct connection of welder arms or electrodes to the terminals. Linear transformers are designed so that the transformer, at least the secondary, extends linearly along a straight line without being doubled, coiled or otherwise folded upon itself. The result of this construction is that the secondary terminals are as far removed from one another as possible. Due to difficulty involved with incorporating linear type transformers into a welder, linear transformers have practically been ignored.

An approach to energy conservation is the use of high frequency transformers, such as, over 60 cps. The total power requirement is reduced by using a frequency above 60 cps, which permits the use of smaller transformers and conductors. Customarily utilized frequencies range from about 180 cps to about 4000 cps, and their use typically requires a generating source.

Size and weight are of critical importance in a portable resistance welder which typically does not exceed about 100 pounds. When high frequency is utilized in portable welders the transformer has been arranged to be physically located on the supported end of the welding gun. Through such an arrangement, in which high frequency and low current power is used, the conductors carrying power to the welding gun are decreased in size (cross section), as opposed to the size and weight of a gun using 60 cps.

For various reasons, vehicle manufacturers have been searching for expanded uses of aluminum. As is well known, substituting aluminum for steel requires a greater thickness of aluminum to obtain comparable strength. Thus, to weld an aluminum workpiece which provides the same strength as a steel workpiece requires the welding of thicker aluminum pieces, and demands from about 2.25 to about 3 times as much welding current as is required for the steel workpiece. This demand combined with the high current loss characteristics of the welding electrodes and conductors results in the total current demand being relatively much larger than with steel of comparable thicknesses. Because of the larger current requirement with aluminum, the problems of designing an acceptably efficient welder are magnified. This is particularly true of an efficient portable welder. If the throat of the portable gun becomes too deep, even high frequency and/or placement of the transformer directly at the back of the welding gun fails to provide an acceptable solution.

In the case of a stationary resistance welder, the throat depth is generally increased by making the electrode arms physically longer. As noted above, the major portion of total power is dissipated in the transfer of current to the electrodes before welding occurs. Obviously, as the electrode arms increase in length, the power consumption increases exponentially.

In the assembly of large items, most notably vehicle bodies, multiple spot welding is often utilized. U.S. Pat. No. 1,103,041 discloses a resistance welder for use in multiple weld applications. The reference also discloses the use of multiple transformers. The stated reason for this construction is to obtain an increase in potential across the electrodes. The workpiece is not intended to be positioned for welding between the transformers as the transformers are not located within the arms of the welder.

U.S. Pat. No. 1,312,845 discusses current loss due to a buildup of current within the portion of workpiece in the throat. An attempt is made to minimize the loss of current by utilizing a partial air core transformer. U.S. Pat. No. 1,362,962 is an example of a stationary welder in which the arms supporting the electrodes have been extended to provide a deep throat. A cubic transformer is physically constructed around the lower arm of the welder.

U.S. Pat. No. 2,491,169 suggests an alternate construction of a deep throat stationary welder. The primary coil of the transformer in this case is one large continuous coil which is physically folded upon itself, that is one half of the coil is doubled over the other half of the coil, to allow access to the throat. The secondary of the transformer is the arms of the welder or current path for the electrodes. A great deal of discussion is included with regard to the care taken to position the doubled coil halves relative to one another so that inductance is minimized rather than increased due to the relative proximity of the halves. In addition, the reference requires half of the primary to use the welder arms as metal core, with the other half being an air core.

One example of a portable welding gun is illustrated in U.S. Pat. No. 2,471,881. Both high frequency current (180 cps) and locating the transformer physically immediately adjacent to the welding gun are discussed in this reference. The construction of this welder is particularly directed to a non-deep throat welder.

Another portable welder is shown in U.S. Pat. No. 2,749,417. In the reference, an extremely small portion of the welding arms are utilized as the core of the transformer. The stated purpose in using the electrodes as the core is to reduce the overall size of the welding gun. As in the prior reference, the design chosen results in a non-deep throat welder.

SUMMARY OF THE INVENTION

The foregoing references focus the fact that resistance welders consume large amounts of electrical power. But while being important, the numerical value of the total power alone is not the critical element. The reactance portion of the total power is the critical element.

The transformers used to obtain the high welding currents result in reactance being introduced. The reactance is related to various factors such as the depth of the welding throat, the proximity of the electrodes and the relative sizes of the electrodes and electrode holders.

While various changes are possible with regard to the above noted factors, the intended output of the welding electrodes dictates the acceptable ranges of the factors. The factors and ranges are generally identical regardless of whether the resistance welder is the stationary type or portable gun type.

The present invention has, as its primary object, the provision of a resistance welder which consumes a smaller amount of electrical power than conventional welders at a more advantageous power factor to enable welding of standard materials, including aluminum, within pre-existing specifications.

In keeping with the state-of-the-art, air core transformers are avoided while the amount of iron forming the core is maximized. The present invention does stike out at new horizons in a number of areas, for example, it unexpectedly benefits from particular use of a linear transformer having an elongated secondary and at least one primary coil with multiple turns. The linear transformer is formed as part of the body portions, not merely attached thereto. While cubic transformers have been provided with segmented coils and integral cooling passages, this invention incorporates these provisions into linear transformers. The linear transformer operates from an alternating current source which may provide a frequency of 60 cps or higher. Preferably in the case of portable welders higher frequency is utilized.

BRIEF DESCRIPTION OF THE DRAWINGS

FIG. 1 is a front elevation view of a conventional portable resistance welding gun utilizing a cubic transformer remotely disposed relative to the gun, from which transformer current is flowed to internally cooled arms of the body of the gun.

FIG. 2 diagrammatically illustrates a front elevation view of a portable resistance welding gun of this invention illustrating internally cooled linear transformers which are formed as part of the arms and function as arms.

FIG. 6 is an exploded perspective view of the lower linear transformer.

DETAILED DESCRIPTION OF A PREFERRED EMBODIMENT

Figure 3:
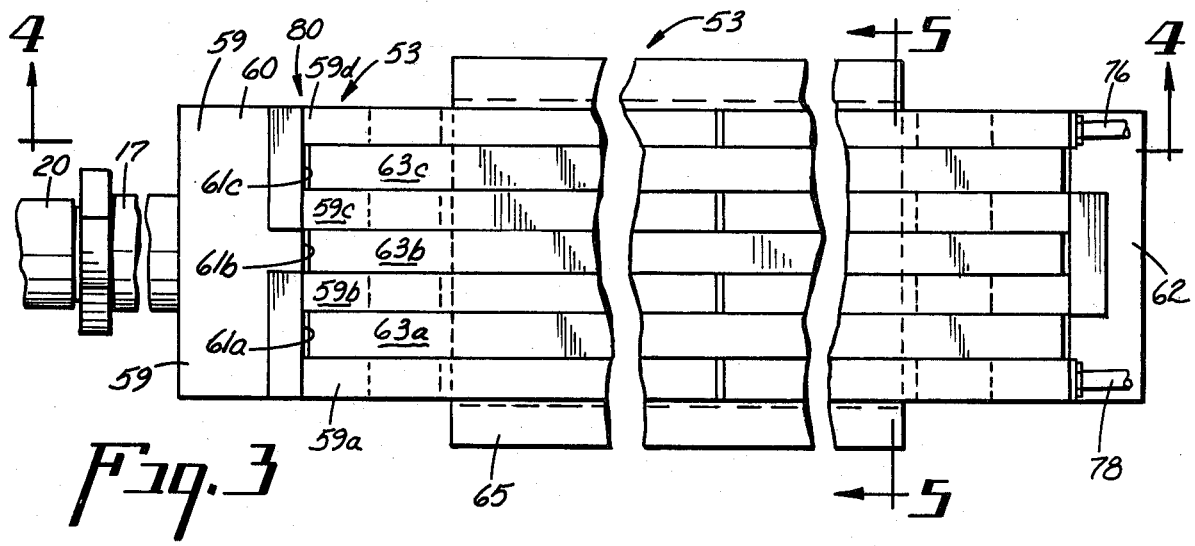
FIG. 3 is a plan view of the lower linear transformer, with portions broken away, which functions as the lower arm.

The present invention is the culmination of a prolonged and determined effort to provide additional current at the electrodes of a deep throat welder and to decrease power consumption without sacrificing the quality of the weld. While a portable resistance welder is described in a specific embodiment illustrated, it must be appreciated that the implementation of the refinements are equally applicable to stationary welders.

For purposes of comparison, a commonly used portable welding gun using a cubic transformer and conductive arms is first described to focus and contrast the use of a linear transformer which, by itself, forms a part of the arm and functions as such. There is shown in FIG. 1 such a portable welding gun, indicated generally by reference numeral 10, including a gun body 12 having a lower arm 13, an upper arm 14 and a vertical portion 15 connecting the arms which together define a U-shaped throat 16. One or more pieces of material to be welded, collectively referred to as a workpiece 11 is shown within the throat 16.

Since the workpiece 11 may be of arbitrary size and shape the configuration of the throat 16 is chosen correspondingly, to accommodate the workpiece. The portable gun 10 shown in FIG. 1 is just one example of the shape of standard, off-the-shelf portable guns available.

For purposes of description herein, the horizontal direction in the drawings is referred to as the X-axis as indicated by the dashed line in FIG. 1, the vertical direction is referred to as the Y-axis indicated by a dashed line in FIG. 2, and therefore the Z-axis refers to a normal direction into the page.

The lower arm 13 has a first electrode holder 17 extending from the arm, coextensive therewith and generally longitudinally adjustable along the X-axis. The electrode holder 17 is adjustably secured in a preselected position by conventional locking means, such as locking bolts 18, to provide optimum positioning of a first electrode 20 relative to the workpiece 11. The first electrode 20 is removably secured to the first electrode holder 17.

The upper arm 14 supports a vertically and horizontally adjustable electrode holding means indicated generally by reference numeral 22. Within the electrode holding means 22 is disposed a second electrode holder 24 which is secured to position a second electrode 26 in vertical spaced apart relationship to the first electrode 20. Further, the second electrode, which is removably secured to the second electrode holder 24, is reciprocable vertically along the Y-axis, intermittently, when a weld is to be made on workpiece 11 between the first 20 and second 26 electrodes.

The adjustable electrode holding means 22, includes a fluid actuated cylinder 28 permanently secured to the top of the upper arm 14 to effect the intermittent reciprocable motion. The fluid actuated cylinder 28 is preferably a double acting cylinder. The piston (not shown) of the cylinder 28 is connected to the second electrode holder 24 so that movement of the holder 24 is simultaneous with actuation of the cylinder 28. A handle 29 and trigger 30 for operation of the cylinder 28 are provided. A source of pressurized fluid (air or liquid) provides fluid to the cylinder 28 in a conventional manner.

The gun body 12, both electrode holders 17 and 24, and both electrodes 20 and 26 are constructed of electrically conductive metal, such as copper and are electrically connected so that a welding current passes through one portion of the body 12 to the first electrode 20, through workpiece 11 to the second electrode 26 and through the remaining portion of the body 12 so that a weld is effected. The welding current is provided by a cubic transformer (not shown) located at a point remote from the gun 10. A pair of electrically conducting cables 32 and 33 carry the welding current from the transformer to the gun 10. The mass of the cables is determined by the current draw demanded from the weld, the gun 10 and the length of the cables 32, 33 themselves.

The ends of cables 32 and 33 are connected to the gun 10 at a connector point 35. The connection at point 35 assures that the cables 32 and 33 are fastened, electrically insulated from one another, so that the electrical circuit noted above is provided to effect the weld. The cables 32 and 33 are shown through-bolted by means of a bolt 36 to individual connectors 38 (only one shown) with an insulating disc (not shown) therebetween.

One of the cables 32 is connected, through the connectors 38, directly to the body 12 of the gun. This cable 32 is therefore directly connected to the first electrode 20 through the first holder 17 and the body 12. The remaining cable 33 is electrically insulated from the body 12 of the gun while being connected to the second electrode 26. This arrangement is accomplished by the cable 33 being connected through the connectors 38 to an insulated connection block 40. A flexible cable 41 connects the insulated connection block 40 to the second electrode holder 24. The flexible cable 41 allows the second electrode 26 and the second holder 24 to move towards the first electrode 20 upon actuation of the cylinder 28.

It is quite important to note that the gun 10 is not a complete electrical circuit. Due to the fact that the cubic transformer is remote from the gun 10, the cables 32 and 33 are necessary to carry electrical current to the gun. Thus the gun 12 and secondary of the cubic transformer together comprise a complete electrical circuit.

The electrical current drawn into the gun body 12 causes the temperature of the entire gun 10 to rise. This is particularly true each time a weld is made with the gun 10. At some point, the heat build-up in the gun 10 due to the current required to flow therethrough militates against continued efficient operation of the gun 10. For this reason, it is preferred that the gun be provided with cooling means such as a recirculating fluid coursed through suitable passages within the gun 10. The fluid, generally water, is connected to the gun 10 through an input tube 43 and an output tube 44. Suitable passages in open fluid communication with each other (not shown) are provided within the body 12, electrode holders 17, 24 and electrodes 20, 26. The passages in the structural elements are made fluid tight by sealing means such as O-rings (not shown). For the purpose of supporting the weight of the welding gun 10 during use, an insulated support hook 45 is permanently affixed to the body 12. A metal cable (not shown) is intended to be secured through the support hook 45 and to a crane or support member above the welder.

As noted above, the welder shown in FIG. 1 is useful to explain generally the components of any welder. The foregoing description serves to explain the function of and to define the essential structural components of welders, whether the welder is stationary or portable and the transformer is cubic.

FIG. 2 diagrammatically illustrates a preferred embodiment of the present invention in a gun welder, generally indicated by reference numeral 46. Reference numerals previously used now indicate analogous components. The gun welder 46 includes a gun body 48 which does not have arms characteristic of a conventional welder. Instead it has linear transformers identified hereinafter, which function as "arms". The gun body 48 has a lower member 80, an upper member 81 and an intermediate member 82 defining the throat 16. The upper member 81 includes a first linear transformer 51 which has secured thereto the second electrode holder 24 and second electrode 26 while the lower member 80 includes a third linear transformer 53 which has secured thereto the electrode holder 17 and first electrode 20. In addition, intermediate member 82 includes a second linear transformer 52. The workpiece 11 is shown inserted into the throat 16 of the gun welder 46. The linear transformers 51, 52, 53 together constitute part of the body 48 of the gun 46. Electrically, primaries of the transformers 51, 52, and 53 may be arranged to be connected in series or parallel as required by the circumstances of the turn ratio and wire thickness.

The input power to the gun 46 is provided through a sheathed cable 54 connected to a remote source (not shown). Two electrical leads 56 and 57 within the cable 54 connect the input power directly to primaries of the linear transformers 51,52 and 53. The secondaries of the linear transformers 51, 52, 53 in addition to the electrode holders 17, 24 and electrodes 20, 26, constitute the complete circuit for the welding current.

The term "welding current" is used herein to indicate the current flowing through the workpiece when a weld is being made. This welding current flows through the gun body, electrodes and electrode holders irrespective of whether the prior art (as shown in FIG. 1) or the present invention (as shown in FIG. 2), is considered. While the current path in gun 10 (FIG. 1) is open circuited between the insulated connection block 40 and the body 12 as a result of the insulation, the welding current path is a complete circuit in the case of welding gun 46 (FIG. 2). The flexible cable 41 is still necessary due to the fact that the second electrode 26 is intermittently reciprocable toward the first electrode 20. However, the connection block 40 to which the flexible cable 41 is attached does not need to be electrically insulated from the body 48 of the gun. In fact, the connection block 40 is directly connected to the remainder of the gun body 48 so that an electrical circuit is completed when the electrodes 20 and 26 are brought together. While the gun body 12 must be electrically connected to the secondary of the transformer by cables 32 and 33 (as shown in FIG. 1), the body 48 is the secondary of the transformers 51, 52, 53 (as shown in FIG. 2).

Whether or not a linear transformer is substituted for each of the body members is a matter of design within the ordinary skill of those in the art. A resistance welder of this invention will necessarily have at least one linear transformer as a substituent for any one of, any two of, or all three of the body members 80, 81, 82 of the gun body 48.

There is schematically illustrated in FIG. 3 a fragmentary plan view showing the construction of one of the linear transformers, in this case linear transformer 53. The construction of each linear transformer, irrespective of performance characteristics desired of each linear transformer, is analogous to the linear transformer described hereinafter.

As indicated hereinbefore the use of linear transformers is contraindicated in welders utilizing conventional welding transformers referred to as cubic. In the cubic transformer, due to the nature of the secondary which is substantially a complete loop, the terminals of the secondary are proximately disposed relative to one another and substantially adjacent. The linear transformer provides the secondary terminals at extreme linear ends of the transformer. It is important that enough of the welder body 48 be utilized as the secondary of at least one linear transformer to generate the necessary secondary current to effect welding of the workpiece. In general, it is necessary that a minimum of 20% of the overall curvilinear length of the body 48 be substituted with a linear transformer if there is to be obtained a significant benefit from the invention. For maximum effect, as shown in FIG. 2, essentially the entire body comprises linear transformers; that is, nearly the entire length of the lower member 80, upper member 81, and intermediate member 82, individually each comprises a linear transformer.

The magnitude of the welding current is such that it is desirable to provide cooling means for the gun sufficient to maintain its temperature during use below about 180° F. and preferably below about 120° F. To this end, each elongated secondary is longitudinally digitated and internal fluid cooling means are provided as described in more detail hereinafter. Digitation of the secondary conveniently provides for a desirable relatively high ratio of plural primary coils to the secondary. A general range of this ratio is in the range from about 1 to about 40, a range from about 4 to about 10 being preferred. Each coil includes a multiplicity of turns.

Referring further to FIG. 3, the lower member 80 comprises a secondary 59 of the linear transformer 53. The secondary 59 which begins as a solid conductor, indicated at reference numeral 60, is longitudinally digitated into plural portions, four shown 59a, 59b, 59c, and 59d. The portions 59a–59d extend the full length of the transformer 53 and are unified again, indicated at reference numeral 62. Spaces 61a, 61b, and 61c between the portions 59a and 59b, 59b and 59c, and 59c and 59d, respectively, are provided for the purpose of positioning primary coils 63a, 63b, and 63c therein, respectively.

As noted above, an important reason for utilizing the secondary portions 59a–59d is to effectively cool the primary coils 63a–63c and to do this, the primary coils are sandwiched between secondary portions by providing one more secondary portion than primary coil as illustrated in FIG. 3.

Figure 4:
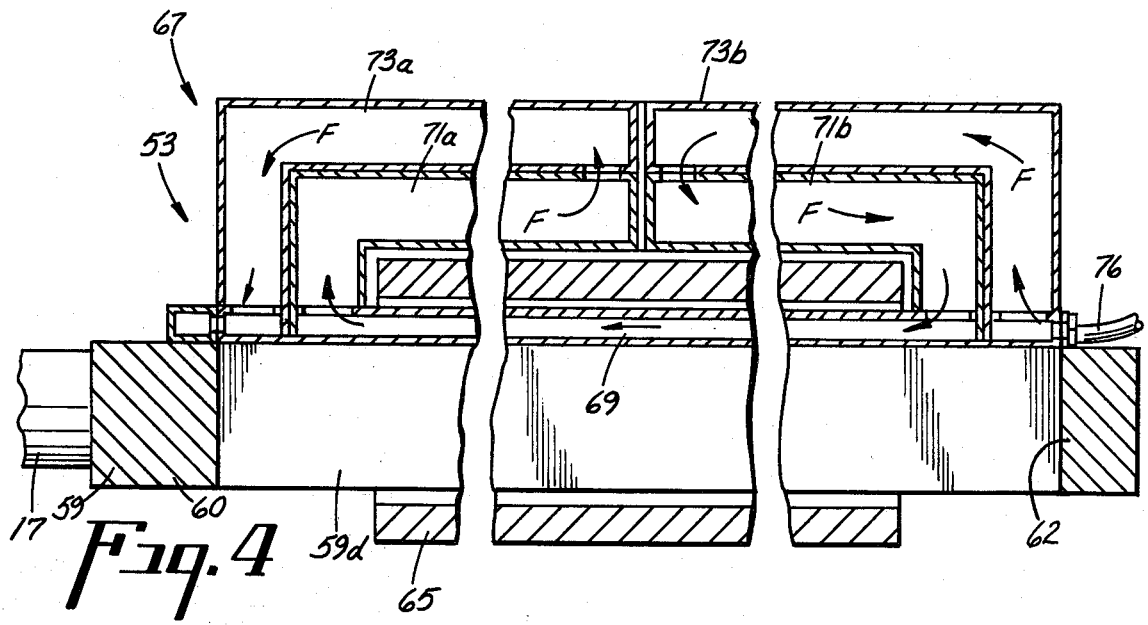
FIG. 4 is a cross-section elevational view of the lower linear transformer taken along line 4—4 of FIG. 3.

There is shown in FIG. 4 a fragmentary elevational partial cross section view to illustrate the flow path of the cooling means. As in prior art welders the novel welder uses internal fluid cooling of the welder. The cooling fluid, generally water, enters the welder through the input tube 43 (shown in FIG. 2) and, after circulating through the welding gun 46, the fluid exits through the output tube 44 (shown in FIG. 2).

The linear transformers 51, 52, and 53 are cooled by plural cooling manifolds, which together comprise a cooling means. One cooling manifold, indicated generally by reference numeral 67, is shown in FIG. 4. Manifold 67 includes a base 69 having a passage and four L-shaped tubes as identified hereinafter. The base 69 and L-shaped tubes are arranged in parallel soldered together relationship to permit cooling fluid flow as shown by the arrows in FIG. 4. The L-shaped tubes are so arranged that coolant is flowed from one pair to the other through the base 69. Near one end of the base 69, each manifold 67 is provided with an L-shaped tube 71a which has a relatively short vertical portion and a relatively long horizontal portion. The vertical portion of tube 71a is permanently secured to an opening provided in the base 69 such that the horizontal portion is parallel to the base. Near the opposite end of the base 69 there is provided another L-shaped tube 71b, similar to 71a and disposed in mirror relationship thereto. The base 69 and the L-shaped tubes 71a and 71b are arranged to be in open fluid communication with one another.

Immediately adjacent to an exterior to L-shaped tube 71a, another L-shaped tube 73a similar to tube 71a has its vertical portion permanently secured to an opening provided in the base 69. The horizontal portion of tube 73a is parallel with and immediately adjacent to the horizontal portions of tube 71a. The ends of the horizontal portions of tubes 71a and 73a are arranged to be in open fluid communication with one another. The vertical portions of tubes 71a and 73a extend into the base 69 only at their common surface such that the base passage is completely blocked. Immediately adjacent to and exterior to L-shaped tube 71b there is provided another L-shaped tube 73b, similar to 73a and similarly disposed in mirror relationship. The base 69 and the L-shaped tubes 73a and 73b, respectively, are arranged to be in open fluid communication with one another. The ends of the horizontal portions of tubes 71b and 73b are arranged to be in open fluid communication with one another and are maintained in longitudinally spaced apart relation with the ends of the horizontal portions of tubes 71a and 73a. The base 69 and tubes 71a, 71b, 73a, and 73b are soldered together in parallel relationship as noted above. The base 69 is permanently secured to the secondary portion (59d in this case) such that the manifold 67 and secondary portion are structurally unitary. Since the manifold is preferably constructed of copper tubing, the manifold and secondary portion are also electrically unitary.

Each secondary portion 59a–59d includes a similar cooling manifold 67. The separate cooling manifolds are connected in series such that the fluid flows from one manifold to the next, through it and to the next. The connections for this series arrangement are made at each end of the base 69. All of the individual connections between manifolds and manifold portions are fluid tight so that no leakage occurs.

The cooling fluid originally enters the cooling manifold 67 through an input 76. After circulating throughout all of the manifolds, the fluid exits through an output 78. The input 76 and output 78 enable the cooling manifolds 67 in linear transformer 53 to be connected to the remaining transformers in the welder 46. In the case of the linear transformer 53, the first electrode holder 17 and first electrode 20 are also cooled. This is accomplished by providing the cooling path within the linear transformer 53 with passages (not shown) within the electrode and holder.

Figure 5:
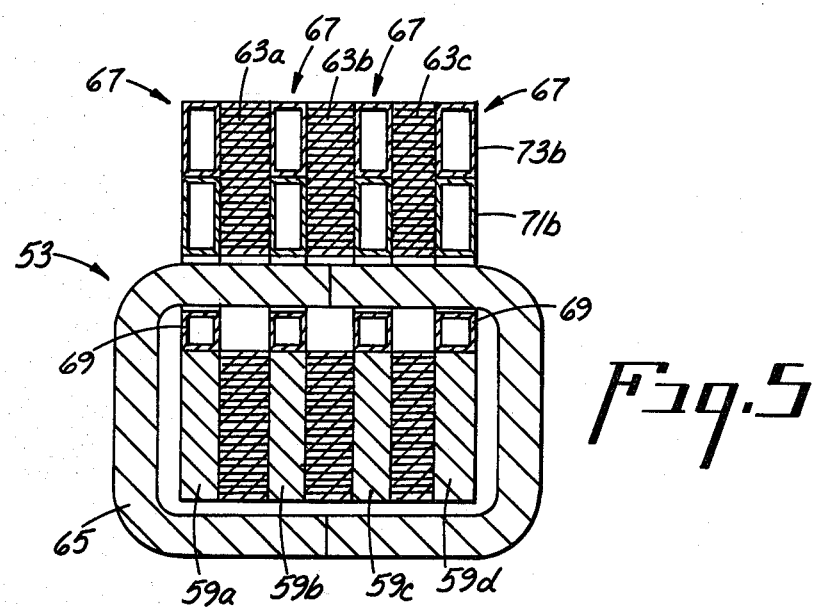
FIG. 5 is a cross-section elevational view of the lower linear transformer taken along line 5—5 of FIG. 3.

The linear transformer 53 shown in cross-section in FIG. 5 has primary coils 63a through 63c constructed by winding turns of flat copper wire over one another until the desired number of turns is achieved. The result is a pancake type coil with an opening in the center. Each cooling manifold 67 is provided with an opening having a formation which is similar to and cooperates with the opening in each of the primary coils to allow insertion of an iron core 65 which is split along its Y axis. The iron core 65 is slideably inserted in the openings provided in the primary coils 63a–63c and the cooling manifolds 67 from each side of the secondary 59. Each half of the iron core 65 extends down one side of the secondary 59 and across half of the bottom of the secondary portions 59a–59d. Each of the lower portions of the primary coils 63a–63c are surrounded by two of the secondary portions 59a–59d (FIG. 5). The upper portions of the primary coils 63a–63c are surrounded by two of the cooling manifolds 67. As in any transformer, an increase in efficiency is obtained with increasing amounts of iron used.

The linear transformer 53 as shown in FIG. 2 is encapsulated in any suitable insulating material, such as a polymeric electrically insulating synthetic resinous material, though such encapsulation is not essential. FIG. 5 shows the linear transformer 53 without the encapsulation. Design and construction of the linear transformer 53 is further exemplified with the aid of FIG. 6.

Insulating material, such as mica, is provided between adjacent secondary portions 59a–59d and cooling manifolds 67 and primary coils 63a–63c. Insulating mica is also provided between longitudinally spaced tubes 71a, 73a and 71b, 73b. The mica is provided to electrically insulate adjacent portions of the transformer.

The primary element of the welder 46 is the linear transformers 51 through 53. The welder is capable of being constructed for stationary or portable uses. The number of linear transformers utilized within the body of the welder is not critical provided that where more than one is used the linear transformers are segmented, that is, separate.

While the frequency is not fixed at which the linear transformers operate there are preferred applications. In this regard, if the particular welder being constructed is intended for portable use, high frequency is preferred. Conventional ranges used in high frequency operation are from 180 cps to about 4,000 cps. It should be noted that while the development at this date involves frequencies only up to 4,000 cps, the invention herein is not limited thereto. If weight limitations are not critical in a stationary welder, standard AC current, i.e. 60 cps, is preferred.

The power supply used to provide high frequency power includes an inverter and switching controls. The inverter produces a square-wave signal which is rendered sinusoidal by the switching controls. The switching controls, generally silicon controlled rectifiers, reverse the polarity of the inverter output every half wave. Inductance and capacitance associated with the switching controls cause the square-wave nature of the inverter output to become rounded. The precise point in the half cycle at which the switching controls triggers determines the current and heat of the weld. The switching controls automatically time the power supply when the heat is readjusted.

As noted above, the unique construction and placement of the linear transformers in the present invention suprisingly provides increased efficiency compared to conventional welders. For comparison purposes, a number of examples are listed below to illustrate the efficiency of the novel welder. A conventional single phase, 60 cps. resistance gun welder with the cubic transformer eight feet away from the gun is compared to a gun as shown in FIG. 2. The throats and electrodes are similar in the case of each welder.

In Example I, two steel portions each having a thickness of 0.035 inch are welded together.

EXAMPLE I

|  | Welding current (amps) | Primary current (amps) |
|---|---|---|
| Conventional Welder | 10,000–15,000 | 650 |
| Novel Welder | 10,000–15,000 | 208 |

In Example II, two aluminum portions each having a thickness of 0.050 inch are welded together. This thickness of aluminum corresponds to the 0.035 inch thickness of steel, since, to achieve equivalent structural strength, the aluminum must be thicker than the steel.

EXAMPLE II

|  | Welding current (amps) | Primary current (amps) |
|---|---|---|
| Conventional Welder | 40,000–50,000 | 2500 |
| Novel Welder | 40,000–50,000 | 800 |

As noted hereinbefore the welding current is the current necessary at the electrodes to complete the weld. The primary current is the amount of current required to be available at the transformer primary terminals in order to produce the corresponding welding current. The difference in current required to the primary is apparent from the values in the examples. Efficiency is measured by a decrease in primary current required to weld identical workpieces. The examples illustrate a decrease in primary current to approximately 33⅓% for the novel welder over the corresponding conventional welder.

I claim:

1. An electrical, resistance-type welding machine comprising, a generally U-shaped body having an upper elongated body member, a lower elongated body member in transversely spaced-apart relationship to said upper body member, and an intermediate elongated body member in electrical communication intermediate said upper and lower body members, said upper, lower and intermediate body members formed as a unitary, physically U-shaped integral structure; each of said body members having a first end and a second end;

a first electrode near said first end of said upper body member;

a second electrode near said first end of said lower body member, said first and second electrodes being oppositely disposed relative to one another for welding;

each body member comprising at least one linear tranformer each such linear transformer having an elongated digitated secondary with terminals near the ends thereof and, associated with said secondary, a primary coil having a predetermined multiplicity of turns;

each linear transformer forming a part of its respective body member so as to function as a structural part thereof and having its secondary electrically connected in series to each other;

the primary coil of each linear transformer positioned adjacent to its respective digitated secondary;

cooling passages within each said secondary and within each of said body members, said passages being sealingly connected in open fluid communication with each other to provide a cooling path for coolant;

said linear transformers together comprising at least 20 percent of the curvilinear length of said U-shaped body;

movement means to effect movement of said first and second electrodes relative to one another; and power supply means remote from said welding machine including electrical conductor means for supplying power from said power supply means to each of said linear transformers.

2. The welding machine according to claim 1 in which said movement means is a fluid actuated cylinder.

3. In an electrical resistance-type welding machine including first and second electrodes, movement means to effect movement of said electrodes relative to one another, power supply means remote from said welding machine, electrical conductor means supplying power from said power supply means to said welding machine, and cooling passages within said welding machine, said passages sealingly connected in open fluid communication with each other to provide a cooling path for coolant, the improvement comprising, a generally U-shaped body having an upper elongated member, a lower elongated member in transversely spaced-apart relationship to said upper member, and an intermediate elongated member intermediate said upper and lower members, said upper, lower and intermediate members forming said U-shaped body, in a unitary, physically intergral structure, each of said members having a first and second end;

said first electrode near said first end of said upper member and said second electrode near said first end of said lower member, said first and second electrodes being oppositely disposed relative to one another for welding; and a plurality of linear transformers electrically connected together, each of said transformers having an elongated secondary with terminals near the ends thereof and, associated with said secondary, a primary coil having a predetermined multiplicity of turns, each of said linear transformers forming a part of said U-shaped body so as to function as a structural member of said U-shaped body, with each said secondary electrically connected in series to each other;

each said secondary of the linear transformer being integrally digitated to provide a plurality of elongated openings in said secondary;

said linear transformers together comprising at least 20 percent of the curvilinear length of said U-shaped body.

4. The improved welding machine according to claim 3 in which said power supply means provides alternating current at a frequency in excess of 60 cps.

5. The improved welding machine according to claim 3 in which the frequency of said alternating current power supply means is in the range from about 180 cps to about 4,000 cps.

6. The improved welding machine according to claim 3 in which said power supply means provides alternating current at a frequency of 60 cps.

* * * * *